UNITED STATES PATENT OFFICE.

FRANZ JURSCHINA, OF VIENNA, AUSTRIA-HUNGARY, ASSIGNOR OF ONE-HALF TO FRANZ KAMMANN, OF SAME PLACE.

SELF-HARDENING CEMENT.

SPECIFICATION forming part of Letters Patent No. 379,580, dated March 20, 1888.

Application filed November 4, 1887. Serial No. 254,303. (No specimens.) Patented in France January 25, 1887, No. 181,121; in England January 27, 1887, No. 1,330, and in Austria-Hungary December 19, 1887, No. 29,838 and No. 57,381.

*To all whom it may concern:*

Be it known that I, FRANZ JURSCHINA, a subject of the Emperor of Austria-Hungary, residing at Vienna, in the Province of Lower Austria, in the Empire of Austria-Hungary, have invented a certain new and useful Composition of Matter, (for which Letters Patent have been obtained in Austria-Hungary, dated December 19, 1887, No. 29,838 and No. 57,381; in France, dated January 25, 1887, No. 181,121, and in England, dated January 27, 1887, No. 1,330;) and I do hereby declare the following to be a full, clear, and exact description of the invention, such as will enable others skilled in the art to which it appertains to make and use the same.

This invention relates to and consists in a novel self-hardening composition or cement, consisting, essentially, of finely-ground quartz (silica) and water-glass, (potassium or sodium silicate,) or the said cements combined with Portland or other hydraulic cement.

The object of this invention is to produce a self setting and hardening compound adapted for use in molding, reproducing fac similes of objects of art, and other purposes—as, for instance, for purposes of printing.

In carrying out the invention the silica is ground to a fine powder, the fineness depending upon the uses made of the cement or composition, as it is obvious that the more delicate the objects to be reproduced or molded the finer should be the silica. The pulverized silica may then be converted into a cement, or self setting and hardening and more or less fluid composition, or into a plastic paste, by the addition thereto of a solution of water-glass—*i. e.*, potassium or sodium silicate. The more or less fluid composition may then be run into molds or over engraved or otherwise ornamented flat surfaces for reproduction, said composition setting and hardening very rapidly, and on drying assuming a more or less stony and porous nature. This latter property is an important one when the composition is to be used for the purpose of printing, as it will retain the ink well; and to this end, type ornamental borders or ornamental or other designs may be obtained from engraved plates, or otherwise produced on or in the material while in a plastic condition, from which impressions can be obtained.

When used in a more or less fluid state, the most delicate works of art can be reproduced, as the composition penetrates readily into the finest lines or readily surrounds the most delicate reliefs, so that objects of art can be readily reproduced with great fidelity.

Under some conditions of use I add to the silica finely-powdered hydraulic cement, which is intimately mixed therewith before adding the solution of water-glass. The proportion of hydraulic cement may be varied, as will be readily understood.

Having thus fully described my invention, what I claim as new, and desire to secure by Letters Patent, is—

The herein described composition of matter, consisting of silica and water-glass—*i. e.*, sodium or potassium silicate—to which my hydraulic cement may be added, substantially as and for the purpose specified.

In testimony whereof I affix my signature in presence of two witnesses.

FRANZ JURSCHINA.

Witnesses:
EDMUND JUSSEN,
OTTO SCHIFFER.

It is hereby certified that in Letters Patent No. 379,580, granted March 20, 1888, upon the application of Franz Jurschina, of Vienna, Austria-Hungary, for an improvement in "Self-Hardening Cement," an error appears in the printed specification requiring correction, as follows: In line 70, the word "my" should be stricken out; and that the Letters Patent should be read with this correction therein that the same may conform to the record of the case in the Patent Office.

Signed, countersigned, and sealed this 27th day of March, A. D. 1888.

[SEAL.]

D. L. HAWKINS,
*Assistant Secretary of the Interior.*

Countersigned:
    BENTON J. HALL,
        *Commissioner of Patents.*